(12) United States Patent
Nakamura et al.

(10) Patent No.: US 7,947,341 B2
(45) Date of Patent: May 24, 2011

(54) OPTICAL LAMINATED BODY

(75) Inventors: Norinaga Nakamura, Okayama (JP); Tomoyuki Horio, Okayama (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 513 days.

(21) Appl. No.: 11/885,715

(22) PCT Filed: Mar. 15, 2006

(86) PCT No.: PCT/JP2006/305123
§ 371 (c)(1),
(2), (4) Date: Apr. 8, 2008

(87) PCT Pub. No.: WO2006/098363
PCT Pub. Date: Sep. 21, 2006

(65) Prior Publication Data
US 2008/0204882 A1    Aug. 28, 2008

(30) Foreign Application Priority Data

Mar. 16, 2005  (JP) ................................ 2005-075380

(51) Int. Cl.
*C09K 19/00* (2006.01)
(52) U.S. Cl. ........................................................ 428/1.1
(58) Field of Classification Search .................. 359/242, 359/581, 586, 587; 428/1.1–1.62
See application file for complete search history.

(56) References Cited

U.S. PATENT DOCUMENTS

| 7,193,781 B2 * | 3/2007 | Nishida .......................... 359/587 |
| 2006/0056030 A1 * | 3/2006 | Fukuda et al. ................ 359/586 |

FOREIGN PATENT DOCUMENTS

| JP | 08-094801 A1 | 4/1996 |
| JP | 2000-266904 A1 | 9/2000 |
| JP | 2001-059902 A1 | 3/2001 |
| JP | 2003-131007 A1 | 5/2003 |
| JP | 2004-263082 A1 | 9/2004 |
| JP | 2004-309932 A1 | 11/2004 |
| JP | 2005-070744 A1 | 3/2005 |

* cited by examiner

*Primary Examiner* — Alessandro Amari
(74) *Attorney, Agent, or Firm* — Burr & Brown

(57) ABSTRACT

An optical laminate is provided which effectively prevents the occurrence of interface reflection and interference infringes by eliminating the interface between a light transparent base material and a hard coat layer. The optical laminate includes a light transparent base material, and an optical modulating layer and a hard coat layer provided on the light transparent base material, in that order. The optical modulating layer includes a component constituting the light transparent base material and a component constituting the hard coat layer.

9 Claims, 2 Drawing Sheets

OPTICAL LAMINATED BODY

CROSS-REFERENCE TO RELATED APPLICATIONS

This application is based upon and claims the benefit of priority from the prior Japanese Patent Applications No. 75380/2005 under the Paris Convention, and, thus, the entire contents thereof are incorporated herein by reference.

FIELD OF THE INVENTION

The present invention provides an optical laminate which has realized the prevention of interfacial reflection and interference fringes.

BACKGROUND OF THE INVENTION

The prevention of lowered contrast and lowered visibility caused by external light reflection or image reflection is required of image display devices, for example, cathode-ray tube display devices (CRTs), plasma displays (PDPs), electroluminescent displays (ELDs), or liquid crystal displays (LCDs). To meet this demand, it is common practice to provide a reflection preventive laminate on the outermost surface of an image display device from the viewpoint of reducing image reflection or reflectance using the principle of light scattering or the principle of optical interference.

When a reduction in image reflection or a reduction in reflectance utilizing the principle of optical interference is contemplated, a layer having a higher-refractive index and a layer having a lower refractive index than the higher-refractive index layer are generally stacked on a light transparent base material. In the optical laminate comprising layers, which are significantly different from each other in refractive index, stacked on top of each other, however, interface reflection and interference fringes often occur in the interface between the mutually superimposed layers. In particular, it has been pointed out that interference fringes are significant in the reproduction of a black color on the image display surface of an image display device and, consequently, the visibility of the image is lowered and, at the same time, the appearance of the image on the image display surface is deteriorated. In this connection, it is said that, when the refractive index of the light transparent base material is different from the refractive index of the hard coat layer, interference fringes are highly likely to occur.

Japanese Patent Laid-Open No. 131007/2003 proposes an optical film characterized in that, in order to suppress the occurrence of interference fringes, the refractive index around the interface of the base material and the hard coat layer is continuously changed.

So far as the present inventors know, however, any optical laminate has not been proposed in which the interface between the light transparent base material and the hard coat layer has been substantially eliminated.

SUMMARY OF THE INVENTION

At the time of the present invention, the present inventors have found that the interposition of an optical modulating layer between the light transparent base material and the hard coat layer can realize the provision of an optical laminate in which the interface between the light transparent base material and the hard coat layer has been substantially eliminated. Accordingly, the present invention provides an optical laminate which could have realized effective prevention of the interface reflection and interference fringes and has improved visibility and mechanical strength by substantially eliminating the interface of the light transparent base material and the hard coat layer.

The present invention provides that an optical laminate comprising a light transparent base material and an optical modulating layer and a hard coat layer provided on the light transparent base material in that order, wherein the optical modulating layer comprises a component constituting the light transparent base material and a component constituting the hard coat layer.

DETAILED DESCRIPTION OF THE INVENTION

Optical Laminate

1. Optical Modulating Layer

Figure 1:
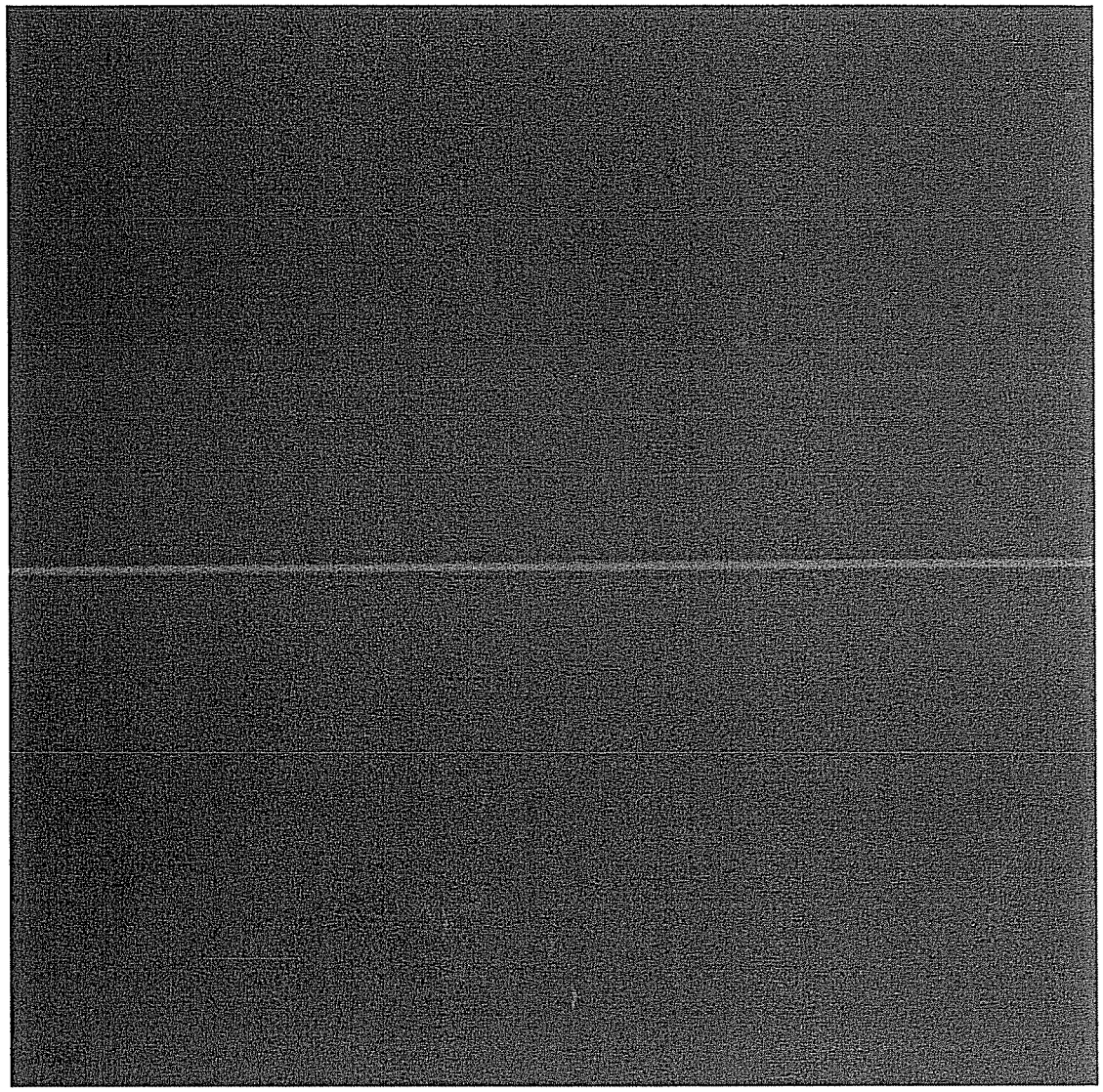
FIG. 1 is a laser photomicrograph of the cross section of an optical laminate according to the present invention.

The optical modulating layer is provided to impart desired optical properties to the optical laminate and functions to regulate the optical properties of the optical laminate, particularly total light transmittance, reflectance, haze value and the like, to desired values. In the present invention, preferably, the optical modulating layer is utilized for eliminating the interface of the light transparent base material and the hard coat layer.

In the present invention, the function of the optical modulating layer is mainly to eliminate the interface of the light transparent base material and the hard coat layer. This connotes that the interface is substantially absent. The expression "interface is (substantially) absent" means that there is no interface although two layer faces are superimposed on top of each other, and further connotes that, based on the refractive index value, the interface is judged to be absent between both the layer faces. A specific example of a criterion based on which the "interface is (substantially) absent" is that, when visual observation of the cross section of the optical laminate under a laser microscope shows the presence of interference fringes, the interface is judged to be present, while, when visual observation of the cross section of the optical laminate under a laser microscope shows the absence of interference fringes, the interface is judged to be absent. The laser microscope can observe the cross section of materials different in refractive index in a nondestructive manner. Accordingly, in the case of materials having no significant difference in refractive index therebetween, the results of the measurement show that there is no interface between these materials. Therefore, it can also be judged based on the refractive index that there is no interface between the base material and the hard coat layer.

The optical modulating layer is formed of a material containing a component of the light transparent base material and a component of the hard coat layer. Accordingly, these components for constituting the optical modulating layer may be the same as those constituting the light transparent base material and the hard coat layer which will be described later. In the present invention, the mixing ratio between the component of the light transparent base material and the component of the hard coat layer for constituting the optical modulating layer may be regulated so as to impart desired optical properties to the optical laminate. The mixing ratio of the component of the light transparent base material to the component of the hard coat layer is preferably 30:70, more preferably 50:50.

The solvent used for optical modulating layer formation is preferably a solvent which can dissolve and/or wet the component of the light transparent base material and the component of the hard coat layer (this solvent being hereinafter often referred to as "penetrating solvent"). Specific examples of such solvents include alcohols such as methanol, ethanol, isopropyl alcohol, butanol, isobutyl alcohol, methyl glycol, methyl glycol acetate, methyl cellosolve, ethyl cellosolve, and butyl cellosolve; ketones such as acetone, methyl ethyl ketone, methyl isobutyl ketone, cyclohexanone, and diacetone alcohol; esters such as methyl formate, methyl acetate, ethyl acetate, ethyl lactate, and butyl acetate; nitrogen-containing compound such as nitromethane, N-methylpyrrolidone, and N,N-dimethylformamide; ethers such as diisopropyl ether, tetrahydrofuran, dioxane, and dioxolane; halogenated hydrocarbon such as methylene chloride, chloroform, trichloroethane, and tetrachloroethane; and other solvents such as dimethyl sulfoxide and propylene carbonate; or mixtures thereof. More preferred solvents include methyl acetate, ethyl acetate, butyl acetate, and methyl ethyl ketone.

Specific examples of preferred penetrating agents include ketones such as acetone, methyl ethyl ketone, cyclohexanone, methyl isobutyl ketone, and diacetone alcohol; esters such as methyl formate, methyl acetate, ethyl acetate, butyl acetate, and ethyl lactate; nitrogen-containing compound such as nitromethane, acetonitrile, N-methylpyrrolidone, and N,N-dimethylformamide; glycols such as methyl glycol, and methyl glycol acetate; ethers such as tetrahydrofuran, 1,4-dioxane, dioxolane, and diisopropyl ether; halogenated hydrocarbon such as methylene chloride, chloroform, and tetrachloroethane; glycol ethers such as methyl cellosolve, ethyl cellosolve, butyl cellosolve, and cellosolve acetate; and other solvents such as dimethyl sulfoxide and propylene carbonate; or mixtures thereof. Preferred are esters and ketones, for example, methyl acetate, ethyl acetate, butyl acetate, and methyl ethyl ketone. Other solvents, for example, alcohols such as methanol, ethanol, isopropyl alcohol, butanol, and isobutyl alcohol; and aromatic hydrocarbons such as toluene, xylene, and styrene may be used as a mixture with the above solvents.

The optical modulating layer may comprise an antistatic agent. Specific examples of antistatic agents include cationic group-containing various cationic compounds such as quaternary ammonium salts, pyridinium salts, primary, secondary and tertiary amino groups, anionic group-containing anionic compounds such as sulfonic acid bases, sulfuric ester bases, phosphoric ester bases, and phosphonic acid bases, amphoteric compounds such as amino acid and aminosulfuric ester compounds, nonionic compounds such as amino alcohol, glycerin and polyethylene glycol compounds, organometallic compounds such as alkoxides of tin and titanium, and metal chelate compounds such as their acetylacetonate salts. Further, compounds produced by increasing the molecular weight of the above compounds may also be mentioned.

Furthermore, polymerizable compounds, for example, monomers or oligomers, which contain a tertiary amino group, a quaternary ammonium group, or a metal chelate moiety and are polymerizable upon exposure to ionizing radiations, or organometallic compounds such as functional group-containing coupling agents may also be used as the antistatic agent. Furthermore, organic electroconductive polymers such as polythiophene, polyaniline, polypyrrole, and polyacetylene are also usable. Specific examples of additional antistatic agents include electroconductive ultrafine particles. Specific examples of electroconductive ultrafine particles include ultrafine particles of metal oxides. Such metal oxides include ZnO (refractive index 1.90; the numerical values within the parentheses being refractive index; the same shall apply hereinafter), $CeO_2$ (1.95), $Sb_2O_2$ (1.71), $SnO_2$ (1.997), indium tin oxide often abbreviated to "ITO" (1.95), $In_2O_3$ (2.00), $Al_2O_3$ (1.63), antimony-doped tin oxide (abbreviated to "ATO," 2.0), and aluminum-doped zinc oxide (abbreviated to "AZO," 2.0). The term "electroconductive fine particles" refers to electroconductive fine particles having a size of not more than 1 micrometer, that is, fine particles of submicron size, preferably fine particles having an average particle diameter of 0.1 nm to 0.1 µm.

2. Light Transparent Base Material

The light transparent base material is preferably smooth and possesses excellent heat resistance and mechanical strength. Specific examples of materials usable for the light transparent base material formation include thermoplastic resins, for example, polyesters (polyethylene terephthalate and polyethylene naphthalate), cellulose triacetate, cellulose diacetate, cellulose acetatebutyrate, polyesters, polyamide, polyimide, polyethersulfone, polysulfone, polypropylene, polymethylpentene, polyvinyl chloride, polyvinylacetal, polyetherketone, polymethyl methacrylate, polycarbonate, and polyurethane. Preferred are polyesters (polyethylene terephthalate and polyethylene naphthalate) and cellulose triacetate. Films of amorphous olefin polymers (cycloolefin polymers: COPs) having an alicyclic structure may also be mentioned as other examples of the light transparent base material, and these are base materials using norbornene polymers, monocyclic olefinic polymers, cyclic conjugated diene polymers, vinyl alicyclic hydrocarbon polymer resins and the like. These films are commercially available, and examples thereof include Zeonex and ZEONOR, manufactured by Zeon Corporation (norbornene resins), Sumilight FS-1700 manufactured by Sumitomo Bakelite Co., Ltd., ARTON (modified norbornene resin) manufactured by JSR Corporation, APL (cyclic olefin copolymer) manufactured by Mitsui Chemicals Inc., Topas (cyclic olefin copolymer) manufactured by Ticona, and Optlet OZ-1000 series (alicyclic acrylic resins) manufactured by Hitachi Chemical Co., Ltd. Further, FV series (low birefringent index and low photoelastic films) manufactured by Asahi Kasei Chemicals Corporation are also preferred as base materials alternative to triacetylcellulose.

The thickness of the light transparent base material is not less than 20 µm and not more than 300 µm. Preferably, the upper limit of the thickness is 200 µm, and the lower limit of the thickness is 30 µm. When the light transparent base material is a plate-like material, the thickness may be above the upper limit of the above-defined thickness range. In forming an optical modulating layer on the light transparent base material, the light transparent base material may be previously subjected to physical treatment such as corona discharge treatment or oxidation treatment or may be previously coated with an anchoring agent or a coating material known as a primer from the viewpoint of improving the adhesion.

3. Hard Coat Layer

The term "hard coat layer" as used herein refers to a layer having a hardness of "H" or higher as measured by a pencil hardness test specified in JIS 5600-5-4 (1999). The thickness (in a cured state) of the hard coat layer is not less than 1 µm and not more than 20 µm. Preferably, the lower limit of the thickness is 2.5 µm, and the upper limit of the thickness is 12 µm. The hard coat layer according to the present invention may comprise a resin and other optional components.

Resin

In the present invention, curable resin precursors such as monomers, oligomers, and prepolymers are collectively referred to as "resin" unless otherwise specified. The resin is preferably transparent, and specific examples thereof are classified into ionizing radiation curing resins which are curable upon exposure to ultraviolet light or electron beams, mixtures of ionizing radiation curing resins with solvent drying-type resins (resins which are formed into films by merely removing a solvent, added for regulating the solid content in the coating, by drying), or heat curing resins. Preferred are ionizing radiation curing resins.

Specific examples of ionizing radiation curing resins include those containing an acrylate-type functional group, for example, oligomers or prepolymers and reactive diluents, for example, relatively low-molecular weight polyester resins, polyether resins, acrylic resins, epoxy resins, urethane resins, alkyd resins, spiroacetal resins, polybutadiene resins, and polythiol polyene resins and (meth)acrylates of polyfunctional compounds such as polyhydric alcohols. Specific examples thereof include monofunctional monomers such as ethyl(meth)acrylate, ethylhexyl(meth)acrylate, styrene, methyl styrene, and N-vinylpyrrolidone, and polyfunctional monomers, for example, polymethylolpropane tri(meth)acrylate, hexanediol(meth)acrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth)acrylate, neopentyl glycol di(meth)acrylate, trimethylol propane triacrylate, pentaerythritol triacrylate, pentaerythritol tetraacrylate, dipentaerythritol hexaacrylate, dipentaerythritol tetraacrylate, and isocyanuric acid modified triacrylate. These acrylates may be those in which a part of the molecule skeleton has been modified, and acrylates modified, for example, with ethylene oxide, propylene oxide, caprolactone, isocyanuric acid, alkyls, cycloalkyls, aromatics, or bisphenols.

When ionizing radiation curing resins are used as an ultraviolet curing resin, preferably, a photopolymerization initiator is used. Specific examples of photopolymerization initiators include acetophenones, benzophenones, Michler's benzoyl benzoate, α-amyloxime ester, and thioxanthones. Preferably, photosensitizers are mixed in the system. Specific examples of photosensitizers include n-butylamine, triethylamine, and poly-n-butylphosphine.

When the ionizing radiation curing resin is an ultraviolet curing resin, a photopolymerization initiator or a photopolymerization accelerator may be added. In the case of radical polymerizable unsaturated group-containing resin systems, examples of photopolymerization initiators usable herein include acetophenones, benzophenones, thioxanthones, benzoins, and benzoin methyl ethers. They may be used either solely or as a mixture of two or more. On the other hand, in the case of cation polymerizable functional group-containing resin systems, examples of photopolymerization initiators usable herein include aromatic diazonium salts, aromatic sulfonium salts, aromatic iodonium salts, metallocene compounds, and benzoinsulfonic esters. They may be used either solely or as a mixture of two or more. The amount of the photopolymerization initiator added is 0.1 to 10 parts by weight based on 100 parts by weight of the ionizing radiation curing composition.

The solvent drying-type resin used as a mixture with the ionizing radiation curing resin is mainly a thermoplastic resin. Commonly exemplified thermoplastic resins are usable. Coating defects of the coated face can be effectively prevented by adding the solvent drying-type resin. Specific examples of preferred solvent drying-type resins include styrenic resins, (meth)acrylic resins, vinyl acetate resins, vinyl ether resins, halogen-containing resins, alicyclic olefinic resins, polycarbonate resins, polyester resins, polyamide resins, cellulose derivatives, silicone resins, and rubbers or elastomers. The resin is generally noncrystalline and, at the same time, is soluble in an organic solvent (particularly a common solvent which can dissolve a plurality of polymers and curable compounds). Particularly preferred are resins having good moldability or film forming properties, transparency, and weathering resistance, for example, styrenic resins, (meth)acrylic resins, alicyclic olefinic resins, polyester resins, and cellulose derivatives (for example, cellulose esters). In a preferred embodiment of the present invention, when the light transparent base material is formed of a cellulosic resin such as triacetylcellulose "TAC," specific examples of preferred thermoplastic resins include cellulosic resins, for example, nitrocellulose, acetylcellulose, cellulose acetate propionate, and ethyl hydroxyethylcellulose.

Specific examples of heat curing resins include phenolic resins, urea resins, diallyl phthalate resins, melamine resins, guanamine resins, unsaturated polyester resins, polyurethane resins, epoxy resins, aminoalkyd resins, melamine-urea cocondensed resins, silicone resins, and polysiloxane resins. When the heat curing resin is used, if necessary, for example, curing agents such as crosslinking agents and polymerization initiators, polymerization accelerators, solvents, and viscosity modifiers may be further added.

Polymerization Initiator

In the formation of a hard coat layer, photopolymerization initiators may be used. Specific examples thereof include 1-hydroxy-cyclohexyl-phenyl-ketone. This compound is commercially available, and examples of commercially available products include Irgacure 184 (tradename, manufactured by Ciba Specialty Chemicals, K.K.).

Optional Components

In the present invention, preferably, the hard coat layer contains an antistatic agent. Further, in the present invention, an anti-dazzling agent may also be added.

Antistatic Agent (Electroconductive Agent)

Specific examples of antistatic agents include cationic group-containing various cationic compounds such as quaternary ammonium salts, pyridinium salts, primary, secondary and tertiary amino groups, anionic group-containing anionic compounds such as sulfonic acid bases, sulfuric ester bases, phosphoric ester bases, and phosphonic acid bases, amphoteric compounds such as amino acid and aminosulfuric ester compounds, nonionic compounds such as amino alcohol, glycerin and polyethylene glycol compounds, organometallic compounds such as alkoxides of tin and titanium, and metal chelate compounds such as their acetylacetonate salts. Further, compounds produced by increasing the molecular weight of the above compounds may also be mentioned. Further, polymerizable compounds, for example, monomers or oligomers, which contain a tertiary amino group, a quaternary ammonium group, or a metal chelate moiety and are polymerizable upon exposure to ionizing radiations, or organometallic compounds such as functional group-containing coupling agents may also be used as the antistatic agent. Electroconductive polymers may be mentioned as the antistatic agent, and specific examples thereof include aliphatic conjugated polyacetylenes, aromatic conjugated poly(paraphenylenes), heterocyclic conjugated polypyrroles, polythiophenes, heteroatom-containing conjugated polyanilines, and mixture-type conjugated poly(phenylenevinylenes). Additional examples of electroconductive polymers include double-chain conjugated systems which are conjugated systems having a plurality of conjugated chains in the molecule thereof, and electroconductive composites which are polymers prepared by grafting or block-copolymerizing the above conjugated polymer chain onto a saturated polymer.

Further, electroconductive ultrafine particles may be mentioned as the antistatic agent. Specific examples of electroconductive ultrafine particles include ultrafine particles of metal oxides. Such metal oxides include ZnO (refractive index 1.90; the numerical values within the parentheses being refractive index; the same shall apply hereinafter), $CeO_2$ (1.95), $Sb_2O_2$ (1.71), $SnO_2$ (1.997), indium tin oxide often abbreviated to "ITO" (1.95), $In_2O_3$ (2.00), $Al_2O_3$ (1.63), antimony-doped tin oxide (abbreviated to "ATO" 2.0), and aluminum-doped zinc oxide (abbreviated to "AZO," 2.0). The term "fine particles" refers to fine particles having a size of not more than 1 micrometer, that is, fine particles of submicron size, preferably fine particles having an average particle diameter of 0.1 nm to 0.1 μm.

In a preferred embodiment of the present invention, the addition amount ratio of the resin to the antistatic agent contained in the hard coat layer is not less than 5 and not more than 25. Preferably, the upper limit of the addition amount ratio is 20, and the lower limit of the addition amount ratio is 5. Good antistatic properties and optical properties can be advantageously realized by regulating the addition amount of the antistatic agent so as to fall within the above-defined numerical value range.

Anti-Dazzling Agent

Fine particles may be mentioned as the anti-dazzling agent. The fine particles may be, for example, in a truly spherical or elliptical form, preferably in a truly spherical form. The fine particles may be of an inorganic type or an organic type. The fine particles exhibit anti-dazzling properties and are preferably transparent. Specific examples of fine particles include inorganic fine particles, for example, silica beads, and organic fine particles, for example, plastic beads. Specific examples of plastic beads include styrene beads (refractive index 1.60), melamine beads (refractive index 1.57), acrylic beads (refractive index 1.49), acryl-styrene beads (refractive index 1.54), polycarbonate beads, and polyethylene beads. The addition amount of the fine particles is approximately 2 to 30 parts by weight, preferably 10 to 25 parts by weight, based on 100 parts by weight of the transparent resin composition.

When the anti-dazzling agent is added to the composition for a hard coat layer, the addition of an anti-settling agent is preferred. The addition of the anti-settling agent can realize the suppression of the settling of the resin beads and can uniform dispersion of the resin beads in the solvent. Specific examples of anti-settling agents include silica beads having a particle diameter of approximately not more than 0.5 μm, preferably 0.1 to 0.25 μm.

Solvent

The hard coat layer may be formed by mixing the above components with a solvent to prepare a composition for a hard coat layer and coating the composition. Specific examples of solvents include alcohols such as isopropyl alcohol, methanol, and ethanol; ketones such as acetone, methyl ethyl ketone, methyl isobutyl ketone, cyclohexanone, and diacetone alcohol; esters such as methyl acetate, ethyl acetate, and butyl acetate; halogenated hydrocarbons; aromatic hydrocarbons such as toluene and xylene; or mixtures thereof. Preferred are ketones and esters.

In the present invention, a preferred solvent may be selected and used according to the type and solubility of the polymer and curable resin precursor in the composition for a hard coat layer. A solvent capable of homogeneously dissolving at least the solid matter (a plurality of polymers and curable resin precursor, a reaction initiator, and other additives) is preferred. Examples of such solvents include ketones (for example, acetone, methyl ethyl ketone, methyl isobutyl ketone, and cyclohexanone), ethers (for example, dioxane and tetrahydrofuran), aliphatic hydrocarbons (for example, hexane), alicyclic hydrocarbons (for example, cyclohexane), aromatic hydrocarbons (for example, toluene and xylene), halogenated hydrocarbons (for example, dichloromethane and dichloroethane), esters (for example, methyl acetate, ethyl acetate and butyl acetate), water, alcohols (for example, ethanol, isopropanol, butanol, and cyclohexanol), cellosolves (for example, methylcellosolve and ethylcellosolve), cellosolve acetates, sulfoxides (for example, dimethylsulfoxide), and amides (for example, dimethylformamide and dimethylacetamide). A mixture solvents composed of two or more of these solvents may be used. Preferred are ketones and esters.

Formation of Hard Coat Layer

The hard coat layer may be formed by mixing the above resin, solvent and optional components together to prepare a composition, and coating the composition onto a light transparent base material. In a preferred embodiment of the present invention, the addition of a fluorine-type or silicone-type leveling agent to the liquid composition is preferred. The liquid composition containing a leveling agent can improve the coating face and can impart contamination preventive properties, scratch resistance and other effects. Further, for example, fluorine-type or silicone-type contamination preventive agents may be added.

Composition coating methods include roll coating, Mayer's bar coating, and gravure coating. After the coating of the liquid composition, the coating is dried and is cured by ultraviolet irradiation. Specific examples of ultraviolet light sources include ultrahigh pressure mercury lamps, high pressure mercury lamps, low pressure mercury lamps, carbon arc lamps, black light fluorescent lamps, and metal halide lamps. A wavelength region of 190 to 380 nm may be used as wavelengths of the ultraviolet light. Specific examples of electron beam sources include various electron beam accelerators, such as Cockcroft-Walton accelerators, van de Graaff accelerators, resonance transformers, insulated core transformers, linear, dynamitron, and high-frequency electron accelerators.

4. Other Layers

In the present invention, an optical laminate comprising an antistatic layer, a lower-refractive index layer or other layer(s) or a combination of two or more of them provided on the outermost surface, outermost back surface, or between layers constituting the optical laminate is preferred.

1) Lower-Refractive Index Layer

The lower-refractive index layer is formed of a resin containing silica or magnesium fluoride, a fluororesin as a lower-refractive index resin, or a fluororesin containing silica or magnesium fluoride and may be a thin film having a refractive index of not more than 1.46 and a thickness of approximately 30 nm to 1 μm, or a thin film formed by chemical vapor deposition or physical vapor deposition of silica or magnesium fluoride. The resin other than the fluororesin may be the same as the resin for constituting the antistatic layer. Preferably, the lower-refractive index layer is provided on the outermost surface of the optical laminate.

The lower-refractive index layer is more preferably formed of a silicone-containing vinylidene fluoride copolymer. Specifically, the silicone-containing vinylidene fluoride copolymer is a resin composition comprising 100 parts of a fluorine-containing copolymer and 80 to 150 parts of an ethylenically unsaturated group-containing polymerizable compound. The fluorine-containing copolymer has a fluorine content of 60 to 70% (the percentage being by mass; the same shall apply hereinafter) and is produced by copolymerizing a monomer composition as a starting material comprising 30 to 90% of vinylidene fluoride and 5 to 50% of hexafluoropropylene. This resin composition is used to form a lower-refractive index layer in the form of thin film which has a thickness of not more than 200 nm and a refractive index of less than 1.60 (preferably not more than 1.46) and to which scratch resistance has been imparted.

In the silicone-containing vinylidene fluoride copolymer constituting the low-refractive index layer, the content of vinylidene fluoride in the monomer composition is 30 to 90%, preferably 40 to 80%, particularly preferably 40 to 70%, or the content of hexafluoropropylene in the monomer composition is 5 to 50%, preferably 10 to 50%, particularly preferably 15 to 45%. The monomer composition may further comprise 0 to 40%, preferably 0 to 35%, particularly preferably 10 to 30%, of tetrafluoroethylene.

So far as the purpose and effect of use of the silicone-containing vinylidene fluoride copolymer are not sacrificed, the monomer composition for producing the copolymer may if necessary contain other comonomer component(s), for example, in an amount of not more than 20%, preferably not more than 10%. Specific examples of such comonomer components include fluorine atom-containing polymerizable monomers such as fluoroethylene, trifluoroethylene, chlorotrifluoroethylene, 1,2-dichloro-1,2-difluoroethylene, 2-bromo-3,3,3-trifluoroethylene, 3-bromo-3,3-difluoropropylene, 3,3,3-trifluoropropylene, 1,1,2-trichloro-3,3,3-trifluoropropylene, and α-trifluoromethacrylic acid.

The content of fluorine in the fluorine-containing copolymer produced from the monomer composition is 60 to 70%, preferably 62 to 70%, particularly preferably 64 to 68%. When the fluorine content is in the above-defined range, the fluorine-containing copolymer has good solubility in solvents. The incorporation of the fluorine-containing copolymer as a component can realize the formation of a thin film having excellent adhesion to various base materials, a high level of transparency, a low refractive index, and, at the same time, excellent mechanical strength. Accordingly, very advantageously, mechanical properties such as scratch resistance of the surface on which the thin film has been formed can be rendered satisfactorily high.

The molecular weight of the fluorine-containing copolymer is preferably 5,000 to 200,000, particularly preferably 10,000 to 100,000, in terms of number average molecular weight as determined using polystyrene as a standard. When the fluorine-containing copolymer having this molecular weight is used, the fluororesin composition has suitable viscosity and thus reliably has suitable coatability. Preferably, the fluorine-containing copolymer per se has a refractive index of not more than 1.45, particularly preferably not more than 1.42, still more preferably not more than 1.40. When a fluorine-containing copolymer having a refractive index of more than 1.45 is used, the antireflection effect of the thin film formed using the fluorine-type coating material is sometimes small.

Specific examples of fluorine-containing monomer units include fluoroolefins (for example, fluoroethylene, vinylidene fluoride, tetrafluoroethylene, hexafluoroethylene, hexafluoropropylene, and perfluoro-2,2-dimethyl-1,3-dioxol), partially or fully fluorinated alkyl ester derivatives of (meth)acrylic acid (for example, Viscoat 6FM (manufactured by Osaka Organic Chemical Industry Ltd.) and M-2020 (manufactured by Daikin Industries, Ltd.)), and fully or partially fluorinated vinyl ethers. Preferred are perfluoroolefins. Hexafluoropropylene is particularly preferred, for example, from the viewpoints of refractive index, solubility, transparency, and availability.

Constitutional units for imparting curing reactivity include constitutional units produced by polymerizing monomers previously containing a self-curable functional group in its molecule such as glycidyl(meth)acrylate and glycidyl vinyl ether, constitutional units produced by polymerizing carboxyl group-, hydroxy group-, amino group-, or sulfo group-containing monomers (for example, (meth)acrylic acid, methylol(meth)acrylate, hydroxyalkyl(meth)acrylate, allyl acrylate, hydroxyethyl vinyl ether, hydroxybutyl vinyl ether, maleic acid, or crotonic acid), and constitutional units containing a curing reactive group, such as a (meth)acryloyl group, introduced, for example, by a polymer reaction (for example, the curing reactive group may be introduced by allowing acrylic acid chloride to act on a hydroxyl group) into the constitutional unit.

In addition to the above fluorine-containing monomer unit and the constitutional unit for imparting curing reactivity, a fluorine atom-free monomer may be properly copolymerized, for example, from the viewpoint of solubility in solvents and transparency of the film. The monomer unit usable in combination is not particularly limited, and examples thereof include olefins (for example, ethylene, propylene, isoprene, vinyl chloride, or vinylidene chloride), acrylic esters (for example, methyl acrylate, methyl acrylate, ethyl acrylate, or 2-ethylhexyl acrylate), methacrylic esters (for example, methyl methacrylate, ethyl methacrylate, butyl methacrylate, or ethylene glycol dimethacrylate), styrene derivatives (for example, styrene, divinyl benzene, vinyltoluene, or α-methylstyrene), vinyl ethers (for example, methylvinyl ether, ethylvinyl ether, or cyclohexyl vinyl ether), vinylesters (for example, vinyl acetate, vinyl propionate, or vinyl cinnamate), acrylamides (for example, N-tert butylacrylamide or N-cyclohexylacrylamide), methacrylamides, and acrylonitrile derivatives.

As described in Japanese Patent Laid-Open No. 92323/1996, Japanese Patent Laid-Open No. 25388/1998, Japanese Patent Laid-Open No. 147739/1998, and Japanese Patent Laid-Open No. 17028/2000, the polymer may be used in combination with a curing agent. In particular, when the curing reactive group of the polymer is a group which as such does not have any curing reactivity, such as a hydroxyl or carboxyl group, the use of the curing agent is indispensable. Curing agents include, for example, polyisocyanate, aminoplasts, polybasic acids, or anhydrides thereof. On the other hand, when the curing reactive group is a self-curing reactive group, there is no need to add any curing agent. If necessary, however, curing agents such as polyfunctional (meth)acrylate compounds and polyfunctional epoxy compounds may also be further used.

A fluorine-containing copolymers particularly useful as the lower-refractive index agent is a random copolymer of perfluoroolefins with vinyl ethers or vinyl esters. In particular, the fluorine-containing copolymer preferably contains a group which as such can undergo a crosslinking reaction [for example, a radically reactive group such as an (meth)acryloyl group, an epoxy group, an oxetanyl group or other ring opening polymerizable group]. Preferably not less than 5% by mole and not more than 70% by mole, particularly preferably not less than 30% by mole and not more than 60% by mole, of all the polymerization units of the polymer is accounted for by the crosslinking reactive group-containing polymerization unit.

Further, in the lower-refractive index agent according to the present invention, a polysiloxane structure is preferably introduced into the fluorine-containing polymer from the viewpoint of imparting the contamination preventive property. The polysiloxane structure can be introduced by any method without particular limitation. Preferred methods thereof include, for example, methods as described in Japanese Patent Laid-Open No. 189621/1999, Japanese Patent Laid-Open No. 228631/1999, Japanese Patent Laid-Open No. 313709/2000, in which a polysiloxane block comonomer component is introduced using a silicone macroazo initiator, and a method as described in Japanese Patent Laid-Open No. 251555/1990 and Japanese Patent Laid-Open No. 308806/1990, in which a polysiloxane graft comonomer component is introduced using a silicone macromer. In these cases, the content of the polysiloxane component in the polymer is preferably not less than 0.5% by mass and not more than 10% by mass, particularly preferably not less than 1% by mass and not more than 5% by mass.

In addition, the lower-refractive index layer may be a thin film of $SiO_2$ formed, for example, by a vapor deposition method, a sputtering method or a plasma CDV method, or a method in which an $SiO_2$ gel film is formed from a sol liquid containing an $SiO_2$ sol. The lower-refractive index layer may be, in addition to the thin film of $SiO_2$, a thin film of $MgF_2$ or a thin film of other material. Preferably, however, the use of a thin film of $SiO_2$ is preferred because the adhesion to the lower layer is high. Among the above methods, when a plasma CVD method is used, preferably, the thin film is formed by using an organosiloxane as a starting gas under such conditions that any other inorganic material vapor deposition source is absent. Further, the vapor deposition is preferably carried out in such a state that the object on which the material is to be deposited is maintained at the lowest possible temperature.

Preferred Lower-Refractive Index Layer

A lower-refractive index layer, which is preferred in the present invention, is preferably formed by preparing a composition for a lower-refractive index layer and coating the composition to form a film. The composition for a lower-refractive index layer may comprise fine particles, a resin and optional components. The lower-refractive index layer may have a single-layer structure or a multilayer structure.

Fine Particles

The fine particles may be of an inorganic or organic type. For example, materials for the fine particles include metals, metal oxides, and plastics. Preferred are fine particles of silicon oxide (silica). The fine particles of silica can impart a desired refractive index while suppressing an increase in refractive index of the binder. The fine particles of silica may be in any form, for example, in the form of a crystalline, sol, or gel form. Further, the fine particles of silica may be a commercially available products, and preferred examples thereof include Aerosil (manufactured by Degussa) and colloidal silica (Nissan Chemical Industries Ltd.).

In a preferred embodiment of the present invention, the utilization of "void-containing fine particles" as a lower-refractive index agent is preferred. "Void-containing fine particles" can lower the refractive index while maintaining the layer strength of the lower-refractive index layer. In the present invention, the term "void-containing fine particle" refers to a fine particle which has a structure comprising air filled into the inside of the fine particle and/or an air-containing porous structure and has such a property that the refractive index is lowered in reverse proportion to the proportion of air which occupies the fine particle as compared with the refractive index of the original fine particle. Further, such a fine particle which can form a nanoporous structure in at least a part of the inside and/or surface of the coating film by utilizing the form, structure, aggregated state, and dispersed state of the fine particle within the coating film, is also embraced in the present invention.

Specific examples of preferred void-containing inorganic fine particles are silica fine particles prepared by a technique disclosed in Japanese Patent Laid-Open No. 233611/2001. The void-containing silica fine particles can easily be produced. Further, the hardness of the void-containing fine particles is high. Therefore, when a lower-refractive index layer is formed by using a mixture of the void-containing silica fine particles with a binder, the layer has improved strength and, at the same time, the refractive index can be regulated to a range of approximately 1.20 to 1.45. Hollow polymer fine particles produced by using a technique disclosed in Japanese Patent Laid-Open No. 80503/2002 are a specific example of preferred void-containing organic fine particles.

Fine particles which can form a nanoporous structure in at least a part of the inside and/or surface of the coating film include, in addition to the above silica fine particles, sustained release materials, which have been produced for increasing the specific surface area and adsorb various chemical substances on a packing column and the porous part of the surface, porous fine particles used for catalyst fixation purposes, or dispersions or aggregates of hollow fine particles to be incorporated in heat insulating materials or low-dielectric materials. Specific examples of such fine particles include commercially available products, for example, aggregates of porous silica fine particles selected from tradename Nipsil and tradename Nipgel manufactured by Nippon Silica Industrial Co., Ltd. and colloidal silica UP series (tradename), manufactured by Nissan Chemical Industries Ltd., having such a structure that silica fine particles have been connected to one another in a chain form, and fine particles in a preferred particle diameter range specified in the present invention may be selected from the above fine particles.

The average particle diameter of the fine particles is not less than 5 nm and not more than 300 nm. Preferably, the lower limit of the average particle diameter is 8 nm, and the upper limit of the average particle diameter is 100 nm. More preferably, the lower limit of the average particle diameter is 10 nm, and the upper limit of the average particle diameter is 80 nm. When the average diameter of the fine particles is in the above-defined range, excellent transparency can be imparted to the lower-refractive index layer.

Hydrophobitization of Fine Particles

In a preferred embodiment of the present invention, the fine particles have been hydrophobitized. The fine particles to be hydrophobitized per se may have a hydrophobic property, a nonhydrophobic property or both hydrophobic and nonhydrophobic properties. The hydrophobitization may be carried out on the whole surface of the fine particles or further to the internal structure. Methods for hydrophobitization of the fine particles include 1) hydrophobitization with a low-molecular organic compound, 2) surface covering hydrophobitization treatment with a polymer compound, 3) hydrophobitization with a coupling agent, and 4) hydrophobitization by grafting of a hydrophobic polymer.

Resin

The resin contains a monomer containing three or more ionizing radiation curable functional groups per molecule. The monomer used in the present invention contains functional groups curable upon exposure to an ionizing radiation (hereinafter often referred to as "ionizing radiation curing groups") and, at the same time, contains heat curing functional groups (hereinafter often referred to as "heat curing groups"). Accordingly, easy formation of a chemical bond such as a crosslinking bond within the coating film to efficiently cure the coating film can be realized by coating a composition (coating liquid) containing this monomer onto the surface of an object, drying the coating, and then applying an ionizing radiation or performing a combination of the application of an ionizing radiation with heating.

The "ionizing radiation curing groups" possessed by this monomer are functional groups which, upon exposure to an ionizing radiation, allow a reaction for increasing the molecular weight to a large value, for example, polymerization or crosslinking, to proceed to cure the coating film. Examples thereof include those which allow the reaction to proceed, for example, through a polymerization reaction such as photoradical polymerization, photocation polymerization, or photoanion polymerization, or a reaction such as addition polymerization or polycondensation which proceeds through photodimerization. Among them, ethylenically unsaturated bonding groups such as acryl, vinyl, and allyl groups are preferred, because they cause a photoradical polymerization reaction directly upon exposure to an ionizing radiation such as ultraviolet light or electron beams or indirectly through the action of an initiator and are relatively easy to handle in steps including the step of photocuring.

The "heat curing groups" which may be contained in the monomer component are functional groups which, in cooperation with an identical functional group or other functional group, can allow a reaction for increasing the molecular weigh to a large value, for example, polymerization or crosslinking upon heating to cause curing. Specific examples of such groups include alkoxy groups, hydroxyl groups, carboxyl groups, amino groups, epoxy groups, and hydrogen bond forming groups. Among these functional groups, the hydrogen bond forming group is preferred because, when the fine particles are inorganic ultrafine particles, the hydrogen bond forming group has excellent affinity for hydroxyl groups present on the surface of the fine particles and can improve the dispersibility of the inorganic ultrafine particles and aggregates thereof in the binder. Among hydrogen bond forming groups, a hydroxyl group is particularly preferred. This is because the hydroxyl group can easily be introduced into the binder component and, by virtue of the storage stability and heat curing of the coating composition, can form a covalent bond with hydroxyl groups present on the surface of inorganic void-containing fine particles, and, consequently, the void-containing fine particles can act as a crosslinking agent to further improve the strength of the coating film. The refractive index of the monomer component is preferably not more than 1.65 from the viewpoint of satisfactorily lowering the refractive index of the coating film.

A monomer component containing two or more ionizing radiation curing groups per molecule may be mentioned as the binder in the coating composition used in the formation of a lower-refractive index layer in the antireflection laminate according to the present invention. The monomer component can advantageously improve the crosslinking density of the coating film and can improve the strength or hardness of the film.

In order to lower the refractive index of the coating film to impart water repellency, the incorporation of the fluorine atom in the molecule is preferred. In the present invention, preferably, a combination of a polymer, which contains a fluorine atom, has a number average molecular weight of not less than 20000 and is curable upon exposure to an ionizing radiation, with a fluorine atom-containing and/or fluorine atom-free monomer containing two or more ionizing radiation curable functional groups per molecule is used. The composition using this combination comprises a monomer and/or polymer, containing an ionizing radiation curing-type fluorine atom as a binder for imparting a film forming property and a lower-refractive index to the lower-refractive index composition.

The fluorine atom-containing and/or fluorine atom-free monomer and/or oligomer in the molecule has the effect of enhancing the crosslinking density of the coating film and is highly fluid due to the low molecular weight and has the effect of improving the coatability of the coating composition. Since the fluorine atom-containing polymer has a satisfactorily large molecular weight, the film forming property is better than the fluorine atom-containing and/or fluorine atom-free monomer and/or oligomer. The fluorine atom-containing polymer when used in combination with the fluorine atom-containing and/or fluorine atom-free monomer and/or oligomer can improve the fluidity, can improve suitability as the coating liquid, can enhance the crosslinking density and thus can improve the hardness or strength of the coating film.

Specific examples of fluorine atom-containing monomers include fluoroolefin (for example, fluoroethylene, vinylidene fluoride, tetrafluoroethylene, hexafluoropropylene, perfluorobutadiene, or perfluoro-2,2-dimethyl-1,3-dioxol), partially or fully fluorinated alkyl, alkenyl, or aryl esters of acrylic or methacrylic acid, fully or partially fluorinated vinyl ethers, fully or partially fluorinated vinyl esters, and fully or partially fluorinated vinyl ketones.

Specific examples of fluorine atom-free monomers include diacrylates such as pentaerythritol triacrylate, ethylene glycol diacrylate, and pentaerythritol diacrylate monostearate; tri(meth)acrylates such as trimethylolpropane triacrylate and pentaerythritol triacrylate; polyfunctional (meth)acrylates such as pentaerythritol tetraacrylate derivatives and dipentaerythritol pentaacrylate; or oligomers produced by polymerizing these radical polymerizable monomers. These fluorine-free monomers and/or oligomers may be used in a combination of two or more.

Optional Components

The lower-refractive index layer comprises hydrophobitized fine particles and a binder and may if necessary further comprise, for example, a fluorine-type compound and/or a silicon compound, and a binder other than an ionizing radiation curing resin composition containing a fluorine atom in its molecule. Further, the coating liquid for lower-refractive index layer formation may contain a solvent, a polymerization initiator, a curing agent, a crosslinking agent, an ultraviolet screening agent, an ultraviolet absorber, a surface modifying agent (leveling agent) and other components.

2) Antistatic Layer

The antistatic layer is formed using a composition for an antistatic layer, comprising an antistatic agent, a solvent, and a resin. The antistatic agent and the solvent may be the same as those described above in connection with the hard coat layer. The thickness of the antistatic layer is preferably approximately not less than 10 nm and not more than 1 µm. The addition amount ratio of the resin to the antistatic agent for antistatic layer formation is preferably not less than 300 and not more than 500. When the addition amount ratio falls within the above-defined range, a good antistatic property of not more than $10^7 \Omega/\square$ can be imparted to the antistatic layer per se and, at the same time, the suitability for coating in forming the antistatic layer can be rendered good.

Resin

Specific examples of resins usable herein include thermoplastic resins, heat curable resins, ionizing radiation curing resins or ionizing radiation curing compounds (including organic reactive silicon compounds). Thermoplastic resins may also be used as the resin. However, the use of heat curing resins is more preferred. The use of an ionizing radiation curing composition containing an ionizing radiation curing resin or an ionizing radiation curing compound is still more preferred.

The ionizing radiation curing composition may be a mixture prepared by properly mixing prepolymer, oligomer, and/or monomer, having a polymerizable unsaturated bond or an epoxy group in the molecule thereof, together. The ionizing radiation refers to electromagnetic radiations or charged particle beams which have energy quantum high enough to polymerize or crosslink the molecule. In general, ultraviolet light or electron beam is used.

Examples of prepolymers and oligomers usable in the ionizing radiation curing composition include: unsaturated polyesters such as condensation products between unsaturated dicarboxylic acids and polyhydric alcohols; methacrylates such as polyester methacrylate, polyether methacrylate, polyol methacrylate, and melamine methacrylate; acrylates such as polyester acrylate, epoxy acrylate, urethane acrylate, polyether acrylate, polyol acrylate, and melamine acrylate; and cationically polymerizable epoxy compounds.

Examples of monomers usable in the ionizing radiation curing composition include: styrenic monomers such as styrene and α-methylstyrene; acrylic esters such as methyl acrylate, 2-ethylhexyl acrylate, methoxyethyl acrylate, butoxyethyl acrylate, butyl acrylate, methoxybutyl acrylate, and phenyl acrylate; methacrylic esters such as methyl methacrylate, ethyl methacrylate, propyl methacrylate, methoxyethyl methacrylate, ethoxymethyl methacrylate, phenyl methacrylate, and lauryl methacrylate; unsaturated substituted-type substituted amino alcohol esters such as 2-(N,N-diethylamino)ethyl acrylate, 2-(N,N-dimethylamino)ethyl acrylate, 2-(N,N-dibenzylamino)methyl acrylate, and 2-(N,N-diethylamino)propyl acrylate; unsaturated carboxylic acid amides such as acrylamide and methacrylamide; compounds such as ethylene glycol diacrylate, propylene glycol diacrylate, neopentyl glycol diacrylate, 1,6-hexanediol diacrylate, and triethylene glycol diacrylate; polyfunctional compounds such as dipropylene glycol diacrylate, ethylene glycol diacrylate, propylene glycol dimethacrylate, and diethylene glycol dimethacrylate; and/or polythiol compounds having two or more thiol groups in the molecule thereof, for example, trimethylolpropane trithioglycolate, trimethylolpropane trithiopropylate, and pentaerythritol tetrathioglycolate.

One of or a mixture of two or more of the above monomers may be optionally used as the monomer in the ionizing radiation curing composition. In this case, from the viewpoint of imparting ordinary suitability for coating to the ionizing radiation curing composition, in the mixture, the content of the prepolymer or oligomer is preferably not less than 5% by weight, and the content of the monomer and/or polythiol compound is not more than 95% by weight.

When flexibility is required of a cured product of a coating of the ionizing radiation curing composition, the amount of the monomer may be reduced, or alternatively, an (meth)acrylate monomer with the number of functional groups being one or two may be used. On the other hand, when abrasion resistance, heat resistance, and solvent resistance are required of the cured product of a coating of the ionizing radiation curing composition, the ionizing radiation curing composition may be designed, for example, so that an (meth)acrylate monomer having three or more functional groups is used. Monomers having one functional group include 2-hydroxy(meth)acrylate, 2-hexyl(meth)acrylate, and phenoxyethyl(meth)acrylate. Monomers having two functional groups include ethylene glycol di(meth)acrylate and 1,6-hexanediol di(meth)acrylate. Monomers having three or more functional groups include trimethylolpropane tri(meth)acrylate, pentaerythritol tri(meth)acrylate, pentaerythritol tetra(meth)acrylate, and dipentaerythritol hexa(meth)acrylate.

A polymer resin not curable upon exposure to an ionizing radiation may also be added to the ionizing radiation curing composition in order to regulate properties, for example, the flexibility and surface hardness of the cured product of a coating of the ionizing radiation curing composition. Examples of polymer resins usable herein include thermoplastic resins such as polyurethane resins, cellulosic resins, polyvinyl butyral resins, polyester resins, acrylic resins, polyvinyl chloride resins, and polyvinyl acetate resins. Among them, polyurethane resin, cellulosic resin, polyvinylbutyral resin or the like is preferred.

When the ionizing radiation curing composition is cured by ultraviolet irradiation after coating, a photopolymerization initiator or a photopolymerization accelerator may be added. Photopolymerization initiators usable in the case of a resin system having a radically polymerizable unsaturated group include acetophenones, benzophenones, thioxanthones, benzoin, and benzoin methyl ether. They may be used alone or as a mixture of two or more. On the other hand, photopolymerization initiators usable in the case of a resin system having a cationically polymerizable functional group include aromatic diazonium salts, aromatic sulfonium salts, aromatic iodonium salts, metallocene compounds, and benzoinsulfonic esters. They may be used alone or as a mixture of two or more. The amount of the photopolymerization initiator added may be 0.1 to 10 parts by weight based on 100 parts by weight of the ionizing radiation curing composition.

The following organic reactive silicon compounds may be used in combination with the ionizing radiation curing composition.

A first type of organosilicon compounds usable herein includes those represented by formula $R_m Si(OR')_n$ wherein R and R' each represent an alkyl group having 1 to 10 carbon atoms and m (subscript of R) and n (subscript of OR') are each an integer with m+n=4.

Specific examples of this type of organosilicon compounds include tetramethoxysilane, tetraethoxysilane, tetra-iso-propoxysilane, tetra-n-propoxysilane, tetra-n-butoxysilane, tetra-sec-butoxysilane, tetra-tert-butoxysilane, tetrapentaethoxysilane, tetrapenta-iso-propoxysilane, tetrapenta-n-propoxysilane, tetrapenta-n-butoxysilane, tetrapenta-sec-butoxysilane, tetrapenta-tert-butoxysilane, methyltriethoxysilane, methyltripropoxysilane, methyltributoxysilane, dimethyldimethoxysilane, dimethyldiethoxysilane, dimethylethoxysilane, dimethylmethoxysilane, dimethylpropoxysilane, dimethylbutoxysilane, methyldimethoxysilane, methyldiethoxysilane, and hexyltrimethoxysilane.

A second type of organosilicon compounds usable in combination with the ionizing radiation curing composition is a silane coupling agent. Specific examples of silane coupling agents usable herein include γ-(2-aminoethyl)aminopropyltrimethoxysilane, γ-(2-aminoethyl)aminopropylmethyldimethoxysilane, β-(3,4-epoxycyclohexyl)ethyltrimethoxysilane, γ-aminopropyltriethoxysilane, γ-methacryloxypropylmethoxysilane, N-β-(N-vinylbenzylaminoethyl)-γ-aminopropylmethoxysilane hydrochloride, γ-glycidoxypropyltrimethoxysilane, aminosilane, methylmethoxysilane, vinyltriacetoxysilane, γ-mercaptopropyltrimethoxysilane, γ-chloropropyltrimethoxysilane, hexamethyldisilazane, vinyltris(β-methoxyethoxy)silane, octadecyldimethyl[3-(trimethoxysilyl)propyl]ammonium chloride, methyltrichlorosilane, and dimethyldichlorosilane.

Formation of Antistatic Layer

A coating film as the antistatic layer is formed by coating a composition comprising a mixture of an antistatic agent, a resin, and a solvent, for example, by roll coating, Mayer bar coating, gravure coating or die coating. After coating of the liquid composition, the coating is dried and cured by ultraviolet light irradiation. The ionizing radiation curing resin composition is cured by irradiation with electron beams or ultraviolet light. In the case of electron beam curing, for example, an electron beam having an energy of 100 KeV to 300 KeV is used. In the case of ultraviolet curing, for example, ultraviolet light emitted form light sources, for example, ultra-high-pressure mercury lamps, high-pressure mercury lamps, low-pressure mercury lamps, carbon arc lamps, xenon arc lamps, and metal halide lamps.

In the present invention, the refractive index layer and other layers may be formed by the above method.

4) Other Layers

In the present invention, other layers such as a pressure-sensitive adhesive layer, a release layer, and a contamination preventive layer may be formed.

Use of Optical Laminate

The optical laminate according to the present invention is utilized as a hard coat laminate, preferably as an antireflection laminate. Further, the optical laminate according to the present invention can be used in transmission image display devices, particularly in displays of televisions, computers, word processors and the like. Among others, the image display device is used on the surface of displays, for example, for CRTs, PTPs, LEDs, and liquid crystal panels.

Polarizing Plate

A polarizing plate is composed mainly of a polarizing film and two protective laminates, the polarizing film being held between the two protective laminates. Preferably, the antireflection laminate according to the present invention is used as at least one of the two protective laminates which hold the polarizing film therebetween. When the optical laminate according to the present invention functions also as the protective laminate, the production cost of the polarizing plate can be reduced. The use of the optical laminate according to the present invention as the outermost layer can provide a polarizing plate that can prevent external light reflection and the like and, at the same time, is also excellent in scratch resistance, contamination preventive properties and the like. The polarizing film may be a conventional polarizing film or a polarizing film taken off from a continuous polarizing film of which the absorption axis of the polarizing film is neither parallel nor perpendicular to the longitudinal axis.

EXAMPLES

The following various Examples further illustrate the present invention. However, it should be noted that the contents of the present invention are not limited by these Examples.

Compositions for respective layers constituting an optical laminate were prepared by mixing components together according to the following formulation and filtering the mixture.

Preparation of Compositions for Optical Modulating Layer

| Composition 1 for optical modulating layer | |
|---|---|
| Modified dipentaerythritol hexaacrylate (KAYARAD DPCA30, manufactured by Nippon Kayaku Co., Ltd.) | 25 pts. wt. |
| Isocyanuric acid EO-modified triacrylate (M315, manufactured by TOAGOSEI Co., Ltd.) | 25 pts. wt. |
| Diacetyl cellulose (L-50, manufactured by Daicel Chemical Industries, Ltd.) | |
| Acetone/cyclohexanone (3:7) solution | 250 pts. wt. |
| Photoinitiator: Irgacure 184 (tradename: manufactured by Ciba Specialty Chemicals, K.K.) | 3 pts. wt. |

| Composition 2 for optical modulating layer | |
|---|---|
| Pentaerythritol triacrylate (tradename PET30: manufactured by Nippon Kayaku Co., Ltd.) | 50 pts. wt. |
| ATO ultrafine particles (tradename SN-100P: manufactured by Ishihara Techno Corp.) | 10 pts. wt. |
| Dispersant: SOLSEPERSE3000 (tradename: manufactured by Avecia) | 50 pts. wt. |
| Diacetyl cellulose (L-50, manufactured by Daicel Chemical Industries, Ltd.) | 20 pts. wt. |
| Acetone/cyclohexanone (5:5) solution | 250 pts. wt. |
| Photoinitiator: Irgacure 184 (tradename: manufactured by Ciba Specialty Chemicals, K.K.) | 4 pts. wt. |

| Composition 3 for optical modulating layer | |
|---|---|
| Dipentaerythritol hexaacrylate (DPHA, manufactured by Nippon Kayaku Co., Ltd.) | 25 pts. wt. |
| Isocyanuric acid EO-modified triacrylate (M315, manufactured by TOAGOSEI Co., Ltd.) | 25 pts. wt. |
| Diacetyl cellulose (L-50, manufactured by Daicel Chemical Industries, Ltd.) | 250 pts. wt. |
| Acetone/cyclohexanone (3:7) solution | |
| Photoinitiator: Irgacure 184 (tradename: manufactured by Ciba Specialty Chemicals, K.K.) | 3 pts. wt. |

| Composition 4 for optical modulating layer | |
|---|---|
| Pentaerythritol triacrylate (PET30, manufactured by Nippon Kayaku Co., Ltd.) | 25 pts. wt. |
| Isocyanuric acid EO-modified triacrylate (M215, manufactured by TOAGOSEI Co., Ltd.) | 25 pts. wt. |
| Diacetyl cellulose (L-50, manufactured by Daicel Chemical Industries, Ltd.) | |
| Acetone/cyclohexanone (3:7) solution | 250 pts. wt. |
| Photoinitiator: Irgacure 184 (tradename: manufactured by Ciba Specialty Chemicals, K.K.) | 3 pts. wt. |

| Composition 5 for optical modulating layer | |
|---|---|
| Modified dipentaerythritol hexaacrylate (KAYARAD DPCA30, manufactured by Nippon Kayaku Co., Ltd.) | 25 pts. wt. |
| Isocyanuric acid EO-modified triacrylate (M315, manufactured by TOAGOSEI Co., Ltd.) | 25 pts. wt. |
| Diacetyl cellulose (L-50, manufactured by Daicel Chemical Industries, Ltd.) | |
| Toluene | 250 pts. wt. |
| Photoinitiator: Irgacure 184 (tradename: manufactured by Ciba Specialty Chemicals, K.K.) | 3 pts. wt. |

Preparation of Compositions for Hard Coat Layer

| Composition 1 for hard coat layer | |
|---|---|
| Modified dipentaerythritol hexaacrylate | 50 pts. wt. |
| Isocyanuric acid EO-modified triacrylate | 50 pts. wt. |
| Photoinitiator: Irgacure 184 (tradename: manufactured by Ciba Specialty Chemicals, K.K.) | 3 pts. wt. |
| Toluene | 100 pts. wt. |

| Composition 2 for hard coat layer | |
|---|---|
| Pentaerythritol triacrylate PET30 (tradename: manufactured by Nippon Kayaku Co., Ltd.) | 100 pts. wt. |
| ATO ultrafine particles SN-100P (tradename: manufactured by Ishihara Techno Corp.) | 10 pts. wt. |
| Dispersant: SOLSEPERSE3000 (tradename: manufactured by Avecia) | 4 pts. wt. |
| Photoinitiator: Irgacure 184 (tradename: manufactured by Ciba Specialty Chemicals, K.K.) | 4 pts. wt. |
| Isopropyl alcohol | 100 pts. wt. |

| Composition 3 for hard coat layer | |
|---|---|
| Pentaerythritol triacrylate | 100 pts. wt. |
| Photoinitiator: Irgacure 184 (tradename: manufactured by Ciba Specialty Chemicals, K.K.) | 3 pts. wt. |
| Toluene | 100 pts. wt. |

| Composition 4 for hard coat layer | |
|---|---|
| Dipentaerythritol hexaacrylate | 100 pts. wt. |
| Photoinitiator: Irgacure 184 (tradename: manufactured by Ciba Specialty Chemicals, K.K.) | 3 pts. wt. |
| Toluene | 100 pts. wt. |

| Composition 5 for hard coat layer | |
|---|---|
| Urethane acrylate (UV1700B, manufactured by Nippon Synthetic Chemical Industry Co., Ltd.) | 50 pts. wt. |
| Polyester acrylate (M9050, manufactured by TOAGOSEI CO., LTD.) | 50 pts. wt. |
| Toluene | 100 pts. wt. |
| Photoinitiator: Irgacure 184 (tradename: manufactured by Ciba Specialty Chemicals, K.K.) | 3 pts. wt. |

| Composition 6 for hard coat layer | |
|---|---|
| Pentaerythritol triacrylate (PET30: manufactured by Nippon Kayaku Co., Ltd.) | 50 pts. wt. |
| Isocyanuric acid EO-modified diacrylate (M215, manufactured by TOAGOSEI Co., Ltd.) | 50 pts. wt. |
| Methyl ethyl ketone | 100 pts. wt. |
| Photoinitiator: Irgacure 184 (tradename: manufactured by Ciba Specialty Chemicals, K.K.) | 3 pts. wt. |

| Composition 7 for hard coat layer | |
|---|---|
| Isocyanuric acid EO-modified diacrylate (M215, manufactured by TOAGOSEI Co., Ltd.) | 100 pts. wt. |
| Toluene | 100 pts. wt. |
| Photoinitiator: Irgacure 184 (tradename: manufactured by Ciba Specialty Chemicals, K.K.) | 3 pts. wt. |

Preparation of Compositions for Respective Refractive Index Layers

| Composition 1 for lower-refractive index layer | |
|---|---|
| Fluorine atom-containing binder resin (tradename: Optool AR100, manufactured by Daikin Industries, Ltd.) | 13 pts. wt. |
| Photocuring resin: PET30 (tradename: manufactured by Nippon Kayaku Co., Ltd.) | 2 pts. wt. |
| Photopolymerization initiator: Irgacure 907 (tradename: manufactured by Ciba Specialty Chemicals, K.K.) | 0.3 pt. wt. |
| Methyl isobutyl ketone | 85.3 pts. wt. |

| Composition 2 for lower-refractive index layer | |
|---|---|
| Surface treated silica sol (void-containing fine particles) (as 20% methyl isobutyl ketone solution) | 14.3 pts. wt. |
| Pentaerythritol triacrylate (PETA) | 1.95 pts. wt. |
| Irgacure 907 (manufactured by Ciba Specialty Chemicals, K.K.) | 0.1 pt. wt. |
| Polyether-modified silicone oil TSF4460 (tradename, manufactured by GE Toshiba Silicone Co., Ltd.) | 0.15 pt. wt. |

-continued

| Composition 2 for lower-refractive index layer | |
|---|---|
| Methyl isobutyl ketone and propylene glycol monoethyl ether (mixed at ratio of 7:3) | 83.5 pts. wt. |

| Composition for higher-refractive index layer | |
|---|---|
| ITO ultrafine particles with average particle diameter of 40 nm | 85 pts. wt. |
| Trimethylolpropane triacrylate | 15 pts. wt. |
| Butanol | 900 pts. wt. |
| Irgacure 907 (manufactured by Ciba Specialty Chemicals, K.K.) | 1 pt. wt. |

Production of Optical Laminate

Example 1

A triacetate cellulose (TAC) film (thickness of 80 μm) was provided. Composition 1 for an optical modulating layer was bar coated onto the surface of the film, and the coated film was dried to remove the solvent. The assembly was exposed to ultraviolet light at an exposure of 72 mJ/cm$^2$ with an ultraviolet light irradiation device (manufactured by Fusion UV Systems Japan KK., light source H bulb) to cure the composition and thus to form a 3 μm-thick optical modulating layer. Next, composition 1 for a hard coat layer was bar coated on the surface of the optical modulating layer, and the coating was dried to remove the solvent, followed by exposure to ultraviolet light at an exposure of 108 mJ/cm$^2$ with an ultraviolet light irradiation device (manufactured by Fusion UV Systems Japan KK., light source H bulb) to cure the composition and thus to form a 5 μm-thick hard coat layer. Thus, an optical laminate was produced.

Example 2

A composition for a higher-refractive index layer (refractive index 1.64) was bar coated on a hard coat layer in the optical laminate produced in Example 1. The coating was dried to remove the solvent, and the dried coating was exposed to ultraviolet light at an exposure of 100 mJ/cm$^2$ to from an 80 nm-thick higher-refractive index layer. Thereafter, composition 1 for a lower-refractive index layer was bar coated on the higher-refractive index layer, and the coating was dried to remove the solvent, followed by exposure to ultraviolet light at an exposure of 192 mJ/cm$^2$ with an ultraviolet light irradiation device (manufactured by Fusion UV Systems Japan KK., light source H bulb) to cure the composition and thus to produce an optical laminate. The layer thickness was regulated so that the minimum value of the reflectance was around 550 nm.

Example 3

An optical laminate was produced in the same manner as in Example 1, except that 40 μm-thick TAC was used, composition 1 for an optical modulating layer was changed to composition 2 for an optical modulating layer, and composition 1 for a hard coat layer was changed to composition 2 for a hard coat layer. Thereafter, composition 2 for a lower-refractive index layer was bar coated on the hard coat layer in the optical laminate, and the coating was dried to remove the solvent, followed by exposure to ultraviolet light at an exposure of 192 mJ/cm$^2$ with an ultraviolet light irradiation device (manufactured by Fusion UV Systems Japan KK., light source H bulb) to cure the composition and thus to produce an optical laminate. The layer thickness was regulated so that the minimum value of the reflectance was around 550 nm.

Example 4

An optical laminate was produced in the same manner as in Example 1, except that composition 1 for an optical modulating layer was changed to composition 3 for an optical modulating layer, and composition 1 for a hard coat layer was changed to composition 5 for a hard coat layer.

Example 5

An optical laminate was produced in the same manner as in Example 1, except that composition 1 for an optical modulating layer was changed to composition 4 for an optical modulating layer, and composition 1 for a hard coat layer was changed to composition 6 for a hard coat layer.

Comparative Example 1

A triacetate cellulose (TAC) film (thickness of 80 μm) was provided. Composition 3 for a hard coat layer was bar coated onto the surface of the film, and the coated film was dried to remove the solvent. The assembly was exposed to ultraviolet light at an exposure of 108 mJ/m$^2$ with an ultraviolet light irradiation device (manufactured by Fusion UV Systems Japan KK., light source H bulb) to cure the composition and thus to form a 5 μm-thick hard coat layer. Thus, an optical laminate was produced.

Comparative Example 2

An optical laminate was produced in the same manner as in Comparative Example 1, except that composition 3 for a hard coat layer was changed to composition 4 for a hard coat layer.

Comparative Example 3

An optical laminate was produced in the same manner as in Comparative Example 1, except that composition 3 for a hard coat layer was changed to composition 7 for a hard coat layer.

Comparative Example 4

An optical laminate was produced in the same manner as in Example 1, except that composition 1 for an optical modulating layer was changed to composition 5 for an optical modulating layer.

Evaluation Tests

The optical laminates of Examples and Comparative Examples were subjected to the following evaluation tests, and the results were are shown in Table 1 below.

Evaluation 1: Interference Fringes Test

In order to prevent the backside reflection of the optical laminate, a black tape was applied the side remote from the hard coat layer in the optical laminate, and, in this state, the optical laminate was visually observed from the face of the hard coat layer or the face of the lower-refractive index layer stacked on the hard coat layer, and the results were evaluated according to the following evaluation criteria.

Evaluation Criteria

⊚: Interference fringes did not take place.

x: Interference fringes took place.

Evaluation 2: Interface Test

The cross section of the optical laminate was subjected to transmission observation under a confocal laser microscope (Leica TCS-NT, manufactured by Leica: magnification "500 to 1000 times") to determine whether or not the interface was present, and the results were evaluated according to the following criteria. Specifically, in order to provide a halation-free sharp image, a wet objective lens was used in a confocal laser microscope, and about 2 ml of an oil having a refractive index of 1.518 was placed on an optical laminate, followed by observation to determine the presence or absence of the interface. The oil was used to allow the air layer between the objective lens and the optical laminate to disappear. For the optical laminates of the Examples and Comparative Examples, this test was carried out upon the stacking of the optical modulating layer and the hard coat layer on the light transparent base material.

Evaluation Criteria

⊚: Interference was not observed (note 1).

x: Interference was observed (note 2).

Notes 1 and 2

Note 1: For all the Examples according to the present invention, as shown in FIG. 1, only the interface of oil face (upper layer)/hard coat layer (lower layer) was observed, and the interface of the hard coat layer and the light transparent base material was not observed.

Figure 2:
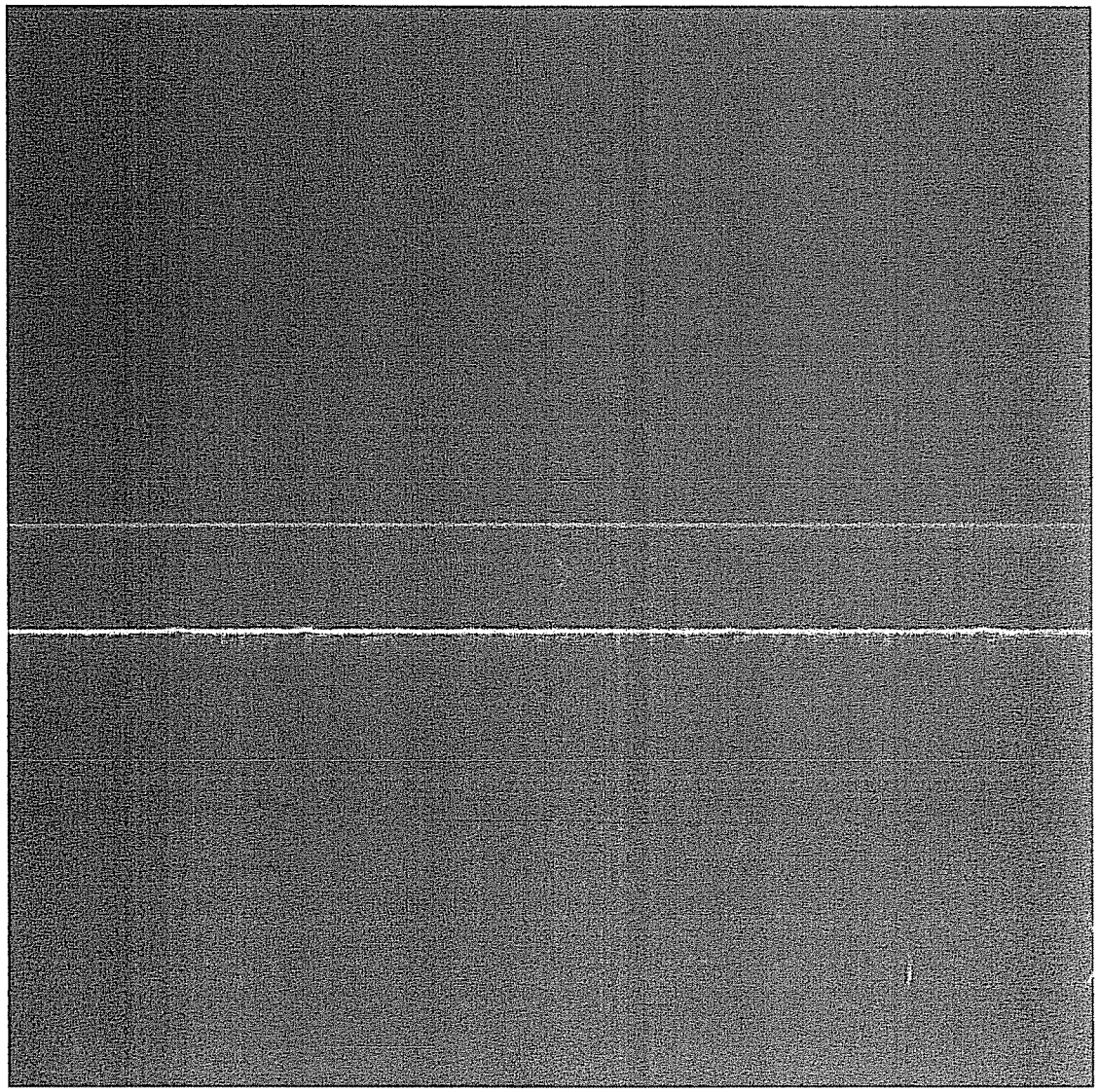
FIG. 2 is a laser photomicrograph of the cross section of a comparative optical laminate.

Note 2: For all the Comparative Examples, as shown in FIG. 2, the interface was observed between adjacent layers of oil face (upper layer)/hard coat layer (middle layer)/light transparent base material (lower layer).

Evaluation 3: Test on Evaluation of Scratch Resistance

A steel wool #0000 was provided and reciprocated on the outermost surface of the optical laminate 10 times under a predetermined frictional load (while changing the load by an 200-g increment in the range of 200 to 1600 g), and the optical laminate was then visually inspected for the separation of the coating film. The results were evaluated according to the following criteria.

Evaluation Criteria

⊚: Coating film was not separated.

x: Coating film was separated.

TABLE 1

|  | Evaluation 1 | Evaluation 2 | Evaluation 3 | (Load, g) |
| --- | --- | --- | --- | --- |
| Ex. 1 | ⊚ | ⊚ | ⊚ | 1600 |
| Ex. 2 | ⊚ | ⊚ | ⊚ | 1000 |
| Ex. 3 | ⊚ | ⊚ | ⊚ | 1000 |
| Ex. 4 | ⊚ | ⊚ | ⊚ | 1000 |

TABLE 1-continued

|  | Evaluation 1 | Evaluation 2 | Evaluation 3 | (Load, g) |
| --- | --- | --- | --- | --- |
| Ex. 5 | ⊚ | ⊚ | ⊚ | 1000 |
| Comp. Ex. 1 | X | X | ⊚ | 1000 |
| Comp. Ex. 2 | X | X | ⊚ | 1000 |
| Comp. Ex. 3 | X | X | X | 200 |
| Comp. Ex. 4 | X | X | ⊚ | 1000 |

The invention claimed is:

1. An optical laminate for use in a liquid crystal display comprising:

a light transparent base material; and an optical modulating layer and a hard coat layer provided on the light transparent base material, in that order;

wherein the light transparent base material is a triacetate cellulose film; and wherein the optical modulating layer comprises a cellulose component and a component constituting the hard coat layer, and wherein a ratio of the cellulose component to the component constituting the hardcoat layer in the optical modulating layer is 28.5:71.5 to 50:50.

2. The optical laminate for use in a liquid crystal display according to claim 1, wherein the optical modulating layer eliminates an interface between the light transparent base material and the hard coat layer, and wherein the component constituting the hard coat layer is trifunctional acrylate, hexafunctional acrylate and ethylene oxide-modified diacrylate, or hexafunctional acrylate and ethylene oxide-modified triacrylate.

3. The optical laminate for use in a liquid crystal display according to claim 1, wherein the hard coat layer contains an antistatic agent.

4. The optical laminate for use in a liquid crystal display according to claim 1, further comprising an antistatic layer or lower-refractive index layer provided on an outermost surface, a rearmost surface, or in each layer of the optical laminate.

5. The optical laminate for use in a liquid crystal display according to claim 1, for use as an antireflection laminate.

6. The optical laminate for use in a liquid crystal display according to claim 1, wherein the optical laminate functions as a polarizing plate.

7. The optical laminate for use in a liquid crystal display according to claim 1, wherein a composition of the optical modulating layer comprises the cellulose component, the component constituting the hard coat layer and a solvent consisting of ketones.

8. The optical laminate for use in a liquid crystal display according to claim 7, wherein the solvent is a mixed solvent consisting of acetone and cyclohexanone.

9. The optical laminate for use in a liquid crystal display according to claim 1, wherein the hard coat layer comprises a hexafunctional acrylate and ethylene oxide-modified triacrylate.

* * * * *